Figure 2:
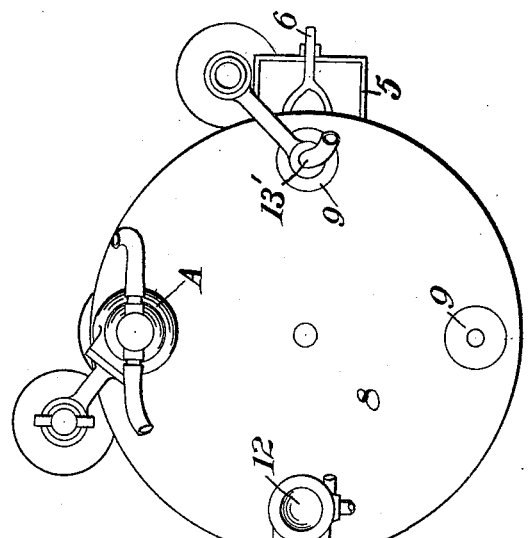

No. 807,066. PATENTED DEC. 12, 1905.
P. EBELING.
MANUFACTURE OF GLASSWARE.
APPLICATION FILED MAR. 28, 1905.

Witnesses:
Cyrus C. Cricks
Vinnie M. Myers

Inventor,
Philip Ebeling
By Jas. Haslet
atty.

UNITED STATES PATENT OFFICE.

PHILLIP EBELING, OF MOUNDSVILLE, WEST VIRGINIA.

MANUFACTURE OF GLASSWARE.

No. 807,066.  Specification of Letters Patent.  Patented Dec. 12, 1905.

Application filed March 28, 1905. Serial No. 252,468.

*To all whom it may concern:*

Be it known that I, PHILLIP EBELING, a citizen of the United States, residing at Moundsville, in the county of Marshall and State of West Virginia, have invented certain new and useful Improvements in the Manufacture of Glassware, of which the following is a specification, reference being had therein to the accompanying drawings.

In the manufacture of glassware it is necessary or desirable to heat, or, in other words, reheat, the articles, and particularly hollow articles, for various purposes, an instance of which is the reheating of a pressed blank to condition it for blowing.

While the new method may be variously practiced in the manufacture of different articles and at different stages in such manufacture and for different purposes, I have in this application for Letters Patent described the same as practiced for heating pressed or partially-formed blanks and have illustrated apparatus for practicing the same in this connection.

In the production of many articles of glassware by machinery at least two forming operations are had, the first resulting in a pressed hollow blank having the neck or other extremity of the article molded to finished form. By the second operation the hollow blank is distended by blowing to give final shape to the body of the article. While this method of manufacture is practiced extensively, it has been successful only in the production of comparatively small articles and articles in which the finest results and effects are not required. Large lamp-globes and similar objects are produced entirely by manual blowing, for the reason that no means has heretofore been proposed for so conditioning the glass by reheating between the pressing and blowing operations as to cause it to expand evenly when being blown. The interior and exterior surfaces of the pressed blank are chilled by the plunger and mold, and the reheating means of prior design have not so operated as to uniformly reheat the blank through and through, including its chilled inner and outer surfaces, with the result that under the blowing operation the glass flows or distends unevenly, and the larger the article the more noticeable the imperfection. The deficiencies in the reheating operation are due to the fact that the reheating-flame or other agency has been applied to one surface only of the blank, usually the exterior, the other surface being heated more or less perfectly by radiation. I have overcome this difficulty, and thereby greatly increased the scope of the method of manufacture referred to by providing for so thoroughly and evenly reheating the blank, whether for a small or large object, that when blown the glass distends with that uniformity and evenness attainable heretofore only by wholly manual manipulation. In practicing my improved method in this connection I preferably employ opposing or oppositely-projected reheating-flames which are directed simultaneously against the interior and exterior of the blank, the latter being so sustained or suspended that the entire bulk of glass forming the same, including its opposite surfaces, is heated with absolute uniformity. As the shape of the pressed blank must not be impaired, the heat must be so applied as to avoid any distorting tendency. This I accomplish by the use of opposing flames, each of which counteracts the other in such manner as to hold the blank in suspension, as it were, with its shape perfectly preserved.

Figure 4:
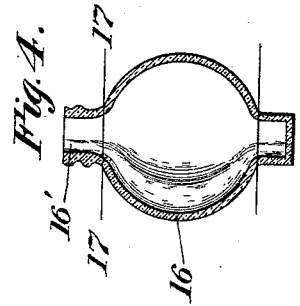
Figure 1:
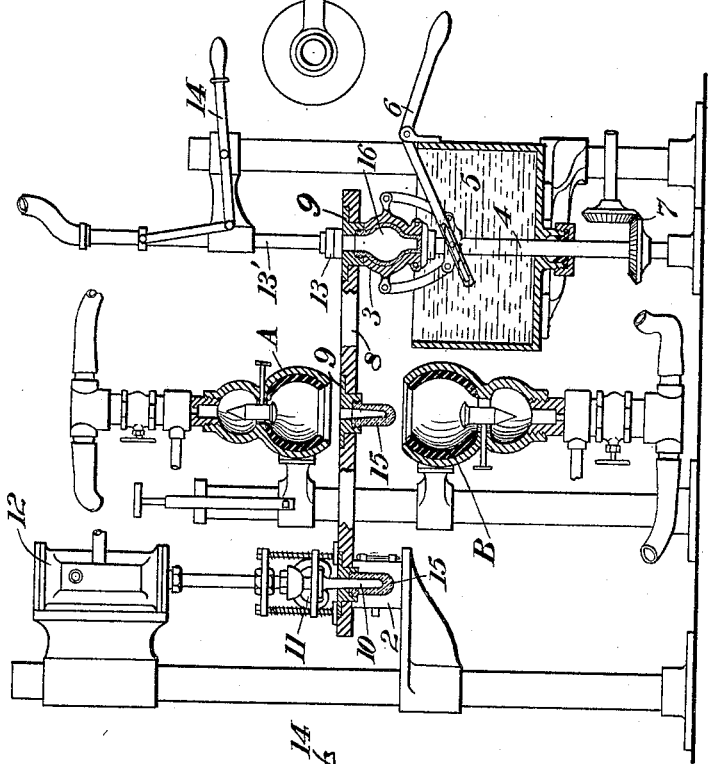
Figure 3:
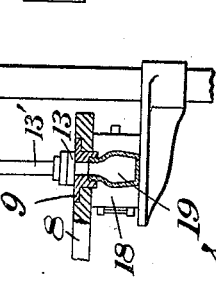

In the accompanying drawings I have illustrated apparatus for practicing the invention in the manufacture of large globular bodies, Figure 1 being a side elevation, partly in section, of such apparatus; and Fig. 2 is a top plan view of the same. Fig. 3 is a view of a portion of the machine, showing a blow-mold of ordinary type, such as used in the manufacture of fruit-jars. Fig. 4 is a detail view of a blown article.

Referring to the drawings, 2 designates a press or blank mold, and 3 a paste-mold, the molds being of usual and well-known construction. The sections of the paste-mold are mounted on pedestal 4, to open outwardly and downwardly into a water-bath 5, as is usual with this type of molds, the opening and closing operations being effected by a hand-lever or treadle 6, as will be understood. In operating paste-molds either the glass or the mold must necessarily rotate, and in the adaptation here shown pedestal or shaft 4 is rotatable and may be driven by gearing 7.

The blank and blow molds are preferably arranged within the radius of a horizontallyrotatable table 8, here shown provided with four evenly-spaced mold-rings 9, the diametrically opposite rings being adapted to register with said molds, while midway between the molds and in the radius of the mold-rings is a station at which a pressed blank is reheated while on its way to the blowing mechanism.

10 is the plunger, 11 the spring-plate mechanism from which the plunger depends, and 12 the plunger-actuating cylinder, all of usual and well-known construction.

13 is the blowing-head, which may be raised and lowered by hand-lever 14 or in any other suitable manner, the blowpipe 13' being connected to a source of compressed air. (Not shown.)

Plunger 10 and the cavity of mold 2 are of such shape that the glass forming the pressed blank 15 is so distributed, dependent on the shape of the article to be blown, as to secure an accurate distention of the glass in the blow-mold, thereby producing an article of absolutely accurate shape in which the glass is of uniform thickness. While the blank is being thus given its preliminary shape the glass is forced upward and caused to adhere to the interior of the mold-rings, the latter being preferably of threaded form to securely hold the blank. At the completion of the blank-forming operation table 8 is given a quarter-turn, thus positioning the blank between the reversely-disposed gas-burners A and B, the former operating to project its flame downward into the interior of the blank, while the flame from burner B envelops the exterior of the suspended blank, and by means of these burners, arranged in opposing relation, the glass is thoroughly and efficiently reheated and properly conditioned for the blowing operation. The effect of the opposing flames is such that any tendency of one burner to distort the blank is opposed or counteracted by the other burner, the blank being held in suspension, as it were, between the opposing flames without being distorted, thereby preserving the accurate shape which it received in the blank-mold. With the blank thus properly conditioned and its previously-chilled inner and outer surfaces thoroughly reheated it is advanced to the paste blow-mold 3, in which the globe or other article 16 of perfect form and uniform thickness is produced. The blown article is then turned to the station opposite the reheating-station, where it is unscrewed or removed from the mold-ring. Subsequently neck 16' thereof is removed at line 17, as indicated in Fig. 4, and if the lower end is formed with a similar neck or projection, as is usual, it may be removed in like manner either in whole or part as may be required to form a perfect article.

In Fig. 3 is illustrated an adaptation of the invention wherein a separable non-rotatable blow-mold 18 of ordinary form is employed, in which the blank is shown to form a fruit-jar or similar article 19, the mold-ring in such case operating to form the threaded neck of the jar, as shown.

While I have shown and described gas-burners so arranged as to project their flames against the glass, other heat-producing agencies may be employed without departing from the spirit and scope of the invention.

While I have shown preferred forms of apparatus for carrying out my improved method, no claims are made herein to such apparatus, as the same form the subject-matter of an application filed March 11, 1905, Serial No. 249,540.

I claim—

1. The method of heating a hollow glass article in the manufacture thereof consisting in heating uniformly and simultaneously the interior and exterior surfaces thereof.

2. The method of heating a hollow glass article consisting in making a direct application of heat to the interior and exterior surfaces thereof.

3. The method of heating a hollow glass article consisting in projecting flames directly against the interior and exterior surfaces of the article.

4. The method of heating a hollow glass article consisting in simultaneously projecting oppositely-disposed flames respectively against the interior and exterior surfaces of the article.

5. The method of heating a hollow glass article consisting in supporting the same with its concavity disposed vertically, and heating uniformly the inner and outer surfaces thereof.

6. The method of heating a hollow glass article consisting in supporting the article with its concavity disposed vertically, and projecting reheating-flames upwardly and downwardly against opposite surfaces of the article.

7. The method of heating a hollow glass article consisting in supporting the article with its concavity open upwardly, projecting a downwardly-directed flame into the concavity of the article, and projecting an upwardly-directed flame against the under or exterior surface of the article.

8. The method of heating a hollow glass blank consisting in supporting the blank with its concavity disposed vertically, and then heating the blank without distorting the shape thereof by projecting reversely-disposed flames simultaneously against the upper and lower surfaces thereof.

9. The method of manufacturing glassware consisting in forming a hollow blank, then making a direct application of heat to both the interior and exterior surfaces of the blank for the purpose of reheating the same, and then blowing the reheated blank.

10. The method of manufacturing glassware consisting in pressing a blank in a mold by means of a plunger, then making a direct application of heat to both the inner and outer surfaces of the blank chilled by contact with the plunger and mold, and then blowing the reheated blank.

In testimony whereof I affix my signature in presence of two witnesses.

PHILLIP EBELING.

Witnesses:
J. M. NESBIT,
VINNIE M. MYERS.